Patented Oct. 12, 1948

2,451,408

UNITED STATES PATENT OFFICE 2,451,408

LIFTING DEVICE FOR AUTOMOBILES

Vincent R. Paolucci, Cleveland Heights, Ohio

Application November 28, 1945, Serial No. 631,310

3 Claims. (Cl. 254—86)

The present invention relates to automobile jacks adapted to be permanently attached to an automobile and to an automobile having a lifting jack permanently attached thereto.

With the use of conventional jacks, it is very difficult to raise the wheels of an automobile for the purpose of changing tires, etc., and the principal object of the present invention is the provision of an automobile jack attached to or adapted to be attached to the body or frame of an automobile as a permanent fixture in such manner as to be readily accessible.

Another object of the invention is the provision of a novel and improved automobile jack which is or is adapted to be attached to the body or frame of an automobile underneath the hood as a permanent fixture and operable from the exterior of the automobile, preferably by mechanism accessible or extending through an opening in the grill or front portion of the hood.

Another object of the invention is the provision of a novel and improved automobile having a jack permanently attached to the body or frame thereof underneath the hood and operable through the grill or front portion of the hood.

Another object of the invention is the provision of a novel and improved frame member secured or adapted to be secured to the body or frame of an automobile for permanently mounting a jack underneath the hood in front of the radiator, with the operating mechanism of the jack accessible from the exterior of the automobile.

Figure 1:
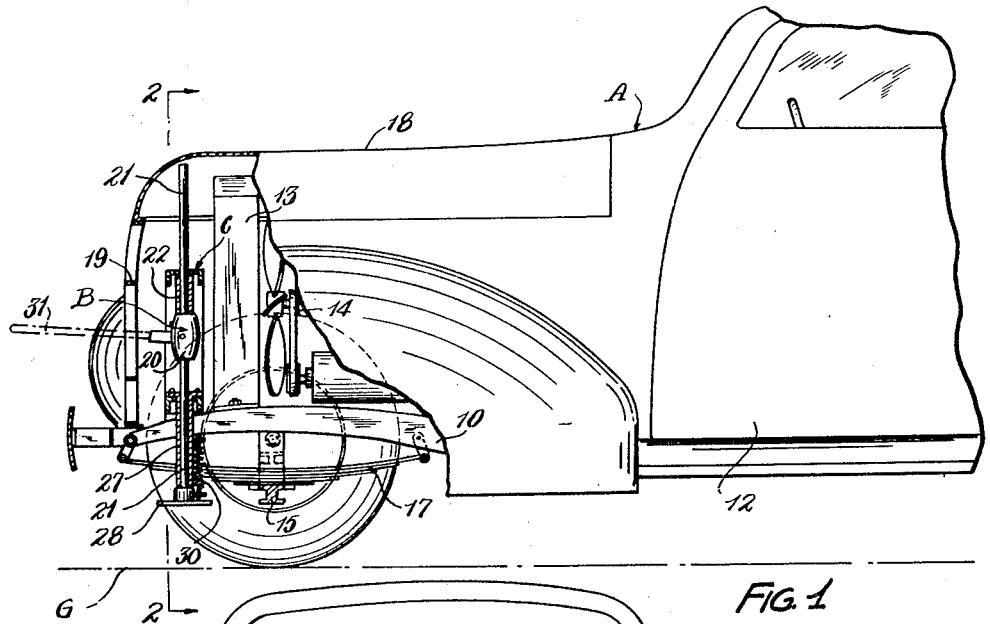
Figure 2:
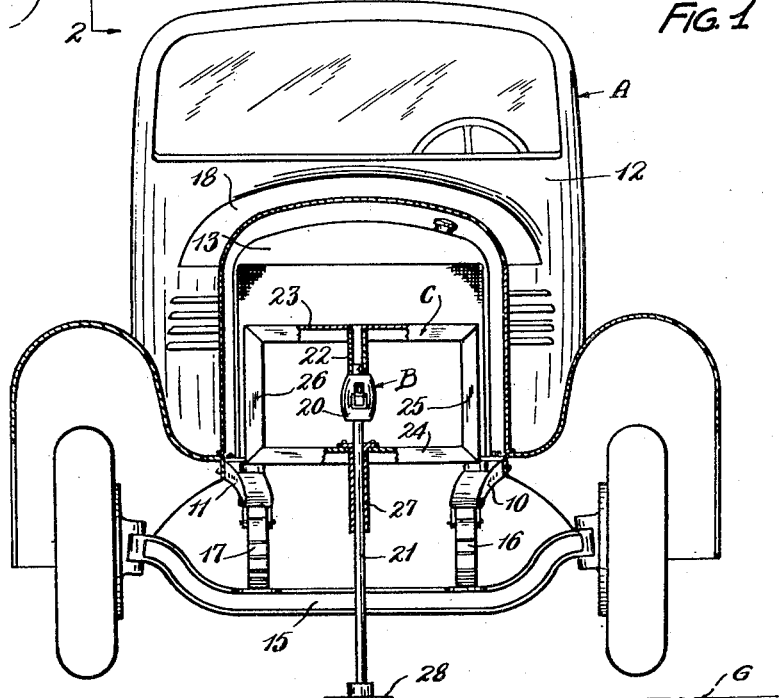

The present invention resides in certain novel constructions and combinations and arrangements of parts and further objects and advantages will be apparent to those skilled in the art to which it relates from the following description of the preferred embodiment described with reference to the accompanying drawing forming a part of this specification in which Fig. 1 is a framentary side elevational view, portions broken away, of an automobile embodying the present invention; and Fig. 2 is a sectional view approximately on the line 2—2 of Fig. 1, with the front wheels of the automobile raised off the ground.

This application contains subject matter derived from and is, in part, a continuation of my copending application Serial No. 590,596, filed April 27, 1945, entitled "Lifting device for automobiles."

Referring to the drawing wherein the showing of the automobile is merely diagrammatical, the reference character A designates generally an automobile of conventional construction, including a frame comprising the usual longitudinally extending side members 10, 11 which support the body 12, radiator 13, engine 14, etc. In addition to the parts referred to, the automobile includes a front axle assembly 15 upon which the front end of the body or frame is supported through the medium of springs 16, 17 and a hood 18 including a front grill or panel 19 within which the radiator, engine, etc., are enclosed.

According to the provisions of the present invention, lifting mechanism for the front end of the automobile is located underneath the hood and behind the grill 19, which mechanism is operable from the exterior of the automobile. As shown, this mechanism includes a jack assembly, designated by the reference character B, operatively connected to a rectangular frame member C, which frame member is, in turn, fixedly secured to the side frame members 10, 11 of the automobile. The jack proper may be of any conventional type, such as, friction, screw, ratchet, etc. The particular jack shown is of the friction type and comprises two relatively movable members 20, 21, the former of which is normally fixed with respect to the frame C and includes the usual operating mechanism. The member 21 is similar to the conventional plunger or bar but longer.

The member 20 of the jack proper is secured to the lower end of a sleeve 22, the upper end of which sleeve is welded to the underside of a transversly extending top member 23 of the frame C including in addition to the top member 23, a bottom transversely extending member 24 and two vertically extending side members 25, 26, all of which members 23 to 26 are welded into an integral structure. Opposite ends of the lower transversely extending member 24 are welded to the side members 10, 11 of the automobile. The movable member or plunger 21 of the jack which extends through the member 20 projects into or through the sleeve 22 which serves as a guide for the upper end thereof and through a flanged sleeve 27 welded to the lower transversely extending member 24 which sleeve serves as a guide for the lower end of the member 21. The construction is such that the movable member or plunger 21 of the jack assembly B is guided by the sleeves 22, 27 while the other part 20 thereof is fixed with respect to the rectangular frame C and the frame or body of the automobile. The lower end of the plunger 21 of the jack is provided with an enlarged ground-engaging member 28 fixedly and non-rockably secured thereto and normally held in engagement with the lower end of the sleeve 27, where it does not interfere with the normal operation of the automobile, by a tension spring 30 connected thereto and to the member 27 approximately midway between its ends.

As previously stated, the jack B is of conventional construction and includes the usual operating mechanism for producing relative movement between the members 20, 21. This operating mechanism includes the usual removable handle 31 which, in the present instance, is insertable through a suitable opening in the front grill 19. This opening may be the usual spacing between vertically extending ribs of the grill or may be provided in some other manner. Alternatively a removable section or panel may be provided through which the handle 31 may be applied and the operating mechanism proper manipulated to raise or lower the front end of the automobile.

It is believed that the operation of the device will be apparent from the foregoing description. With the device installed in an automobile, as shown in Fig. 1, it is only necessary to insert the handle or operating member of the jack through the opening in the front grill and manipulate it in the proper manner to elevate the front end of the automobile. In the present instance, reciprocation of the handle 31, causes the rod or plunger 21 to move downwardly until the member 28 engages the ground, the position of which is indicated in the drawing by the dot dash line G. Continued reciprocation of the handle causes the plunger 21 to elevate the automobile, see Fig. 2, due to relative movement between the rod 21 and the member 20, the latter being in engagement with or fixed to the lower end of the sleeve 22. The sleeve members 22, 27 maintain the jack in proper position relative to the automobile. When it is desired to lower the automobile, the jack is manipulated to release the frictional engagement between the members 20, 21, after which the weight of the automobile and the action of the spring 30 operate to raise the rod 21 until the ground-engaging member 28 abuts the lower end of the sleeve 27. Attention is called to the fact that the jack is located relatively close to the axis for the front wheels, with the result that the automobile may be raised with less elevation of the front end thereof than when a bumper jack is employed.

While the preferred embodiment of the invention has been described in considerable detail and as comprising a single jack fixedly secured to the frame of the automobile by means of the rectangular member C, it is obvious that two jacks may be employed and that any suitable means may be provided for operatively connecting the jack or jacks proper to the automobile other than the frame member C disclosed. In the event two jacks are employed, the jacks are located on opposite sides of the longitudinal centerline of the car and either or both sides of the automobile may be raised selectively. The part 20 of the jack may be permitted to float between the upper and lower guide sleeves 22, 23 in place of being secured to the upper sleeve 22 since the spring 30 will maintain it in operative engagement with the sleeve 22. Alternatively the member 20 may be fixed with respect to the lower guide sleeve 27 or the lower cross member 24, if desired.

The invention has been disclosed as applied to the front end of an automobile but with some modification a similar arrangement can be provided for the rear end. The fact that the jack lifts the body or frame of the automobile, as distinguished from the axle, imposes no limitation upon the location of the jack lengthwise of the car.

From the foregoing description it is apparent that the objects heretofore enumerated and others have been accomplished and that there has been provided an improved automobile comprising a built-in jack for lifting the front end of the automobile without the usual difficulties and dangers incident to the use of a removable jack. While the preferred embodiment of the invention has been shown and described in considerable detail, the invention is not limited to the particular construction shown but may be otherwise incorporated and it is my intention to hereby cover all modifications and uses which come within the practice of those skilled in the art to which it relates and within the spirit and scope of the appended claims.

Having thus described my invention, I claim:

1. In a motor-driven vehicle including a frame having a radiator and an ornamental grill mounted adjacent the forward end of said frame with the grill having an opening therethrough, a transversely extending supporting member attached to said frame between said radiator and grill, a vertically extending elongated hollow member attached to said supporting member at substantially the mid-point of the latter and of the width of said vehicle, and a jack mechanism including two relatively movable members one of which is elongated and disposed in said hollow member with a sliding fit and the other of which is operatively connected to said supporting member, non-rockable means on the lower end of said elongated member adapted to engage the ground, and manually operable means disposed between said radiator and grill and adapted to be actuated through the opening in the latter to produce relative movement between said relatively movable members.

2. In a motor-driven vehicle, a body frame including spaced longitudinally extending side members and an engine-enclosing hook provided with an opening in the front thereof, a supporting frame extending transversely within said hood adjacent to the front end of said body frame and connected to the side members thereof, a jack mechanism comprising a vertically movable member and operating mechanism therefor, vertically extending elongated hollow members connected to said supporting frame at substantially the mid-point thereof with said movable member having a slide fit within said hollow members, non-rockable means on said movable member adapted to engage the ground, the said operating mechanism being located within said hood in operative engagement with one of said hollow members and adapted for manual actuation from a point exteriorly of said hood by an instrument inserted through the said opening in the hood.

3. In a motor-driven vehicle including a frame, a radiator adjacent the forward end of said frame, an ornamental grill having an opening therethrough, supporting means connected to the vehicle frame transversely thereof between said radiator and grill and extending vertically upward therebetween, said supporting means comprising a pair of horizontally extending members spaced from each other in a common vertical plane, and an elongated hollow member attached to each of said horizontally extending members substantially at the mid-point thereof and extending in vertical alignment with the lower end of the upper hollow member terminating a substantial distance above the top of the lower hollow member, a jack mechanism including a vertically movable plunger and operating mechanism therefor, the said plunger being disposed in said hollow members with a sliding fit, and a non-rockable ground engaging member on said plunger, the said operating mechanism being located between said hollow members and adapted to be manually actuated from a point exteriorly of the vehicle by an instrument inserted through said opening in said grill.

VINCENT R. PAOLUCCI.

REFERENCES CITED

The following references are of record in the file of this patent:

UNITED STATES PATENTS

| Number | Name | Date |
|---|---|---|
| 1,937,170 | Smith | Nov. 28, 1933 |
| 2,169,913 | De Nault | Aug. 15, 1939 |
| 2,234,220 | Antonietta | Mar. 11, 1941 |
| 2,241,877 | Contrino | May 13, 1941 |
| 2,330,894 | Jezler | Oct. 5, 1943 |

FOREIGN PATENTS

| Number | Country | Date |
|---|---|---|
| 121,646 | Great Britain | Jan. 2, 1919 |